May 2, 1933.                C. F. JENKINS                1,907,116
                            FRICTION DRIVE
                         Filed Sept. 6, 1928
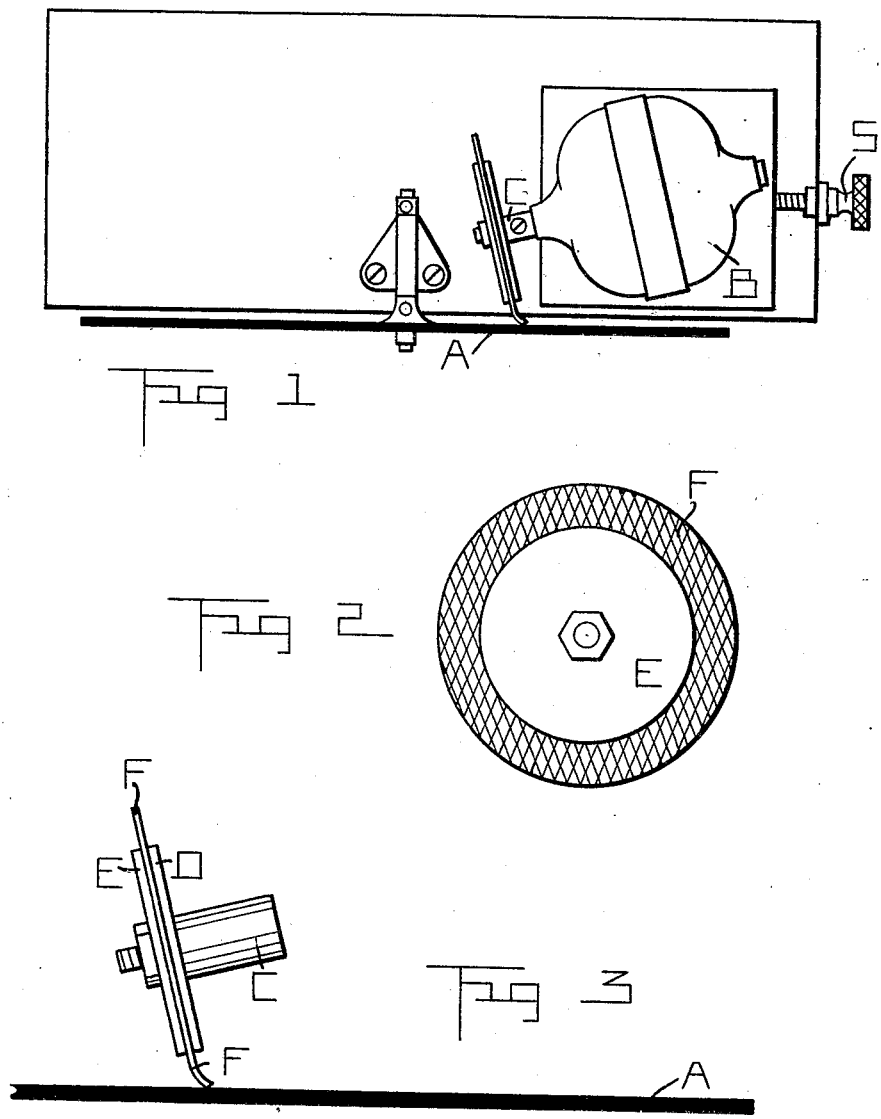

Patented May 2, 1933

1,907,116

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

FRICTION DRIVE

Application filed September 6, 1928. Serial No. 304,352.

This invention relates to radiovision and radiomovies devices, and has for its object simple and dependable means for maintaining synchronism between receiver and transmitter.

Heretofore synchronism has been attempted by varying an adjustable resistance in circuit with the motor driving the scanning means.

But such adjustments disturb the natural period of the motor, the speed for which the motor was designed, and is not a success where the speed must be so delicately maintained in spite of line voltage changes and other disturbances.

The invention herein described, however, does provide exactly the extremely minute changes of speed and smoothness required at all times in this art, and by the simplest of means.

With this object in view, the invention consists of the novel combination of elements described herein, illustrated in the drawing, and particularly pointed out in the claims.

In the drawing, Figure 1 is a top view of a radiovision receiver embodying the invention; and Figures 2 and 3, details in enlarged drawing.

In all the figures, A is a scanning disc mounted to rotate in front of a neon lamp, which for clarity is not shown in the drawing; B, a motor for driving the disc; C a hub on the shaft of the motor, with flanges D and E thereon, and between which a soft rubber disc F is clamped; and S a screw for shifting the position of the driving motor.

The adjustment of the speed of the scanning disc is accomplished by moving the constant-speed motor toward or away from the centre of the scanning disc. This is done by turning the screw S to make the rubber driving disc contact with the scanning disc at a longer or shorter radius point.

The rubber disc is larger in diameter than the clamping flanges, and being of very soft rubber and relatively thin, long-radius section, the contact with the driven disc is not on the edge, but rather on the side of the disc as it bends over at the point of contact with the scanning disc; shown in detail in Figure 3.

The deformation of the contact edge of the rubber driving disc gives a contact surface extremely elastic, and which absorbs and neutralizes any tendency to minute changes of speed. It also neutralizes any inequalities of contact surfaces, and any wabble in the driven disc.

These several faults of surface contact and variations of speed are usually imperceptible in other arts, but in this art where an accuracy of the order of one in five-hundred thousand in synchronism of running speeds is required for finest results, means for absorbing any causes which disturb symmetry are highly important.

Resistances permitting very delicate changes for varying the speed in driving motors were tried by applicant over a considerable period, but none were satisfactory. The mechanism herein described, after years of experiment, was adapted and found far superior to any other.

It is probable that other forms of this invention might be adapted, and I do not wish to limit it to the form shown. The essential principal involved is an extremely elastic connection between the driver and the driven members by which inequalities of speed and surface are absorbed and disappear.

As the method of, and reason for, scanning a picture surface in this art is now so well known, and is not essential to an understanding of this invention, no description herein is thought necessary, and has, therefore, not been included.

What I claim, therefore, is—

1. In a television system the combination of a rotatable scanning member and means for driving said member including a flexible disc rotating in a plane at an angle to the plane of the scanning member, said disc at the point of contact with said scanning member being bent out of the plane of the disc proper.

2. The combination according to claim 1 in which the disc at the point of contact is of less radius than the remainder of the disc.

3. The combination according to claim 1 in which the disc is of elastic material.

4. The combination according to claim 1 in which the disc is of sheet rubber.

5. In a television system the combination of a rotatable scanning member and means for driving said member including a flexible circular disc adapted to contact with said member intermediate the axis and edge thereof, said disc at the point of contact being deformed to provide a driving surface greater than the thickness of the disc.

6. In a television system the combination of a rotatable scanning member, a motor for driving said member, means for coupling said motor to said member comprising a rotating rubber driving disc, means for moving said disc bodily with respect to said scanning member to vary the speed of said member throughout a relatively wide range, said disc adapted to have its edge deformed to vary the speed of said member throughout a limited range.

7. In combination a rotatable television scanner, a motor for driving said member and a coupling device for said motor and said member including an elastic disc attached to the motor shaft, and means for varying the effective driving ratio between said disc and said scanning member, said means including a member for moving the disc bodily with respect to said rotatable member and for varying the deformation of the disc edge to control the speed of said rotatable member in minute degrees.

8. Scanning means according to claim 7 in which the coupling member has a rigid central portion and a flexible rim portion adapted to be deformed at the point of driving contact.

9. In combination a television scanner member to be driven, a driving motor, a driving disc having a flexible edge coupled to said motor, a frame on which said motor is mounted, means for adjusting the position of said frame and motor to vary the effective driving ratio between said disc and said driving member, said disc adapted to have its edge deformed to control the speed of said driving member in minute variations.

In testimony whereof I have affixed my signature.

CHARLES FRANCIS JENKINS.